(12) United States Patent
Sever et al.

(10) Patent No.: US 7,541,975 B2
(45) Date of Patent: Jun. 2, 2009

(54) ENHANCED GNSS SIGNAL PROCESSING

(75) Inventors: Manfred Dieter Martin Sever, Aurora (CA); Michael Timo Allison, Salisbury (GB)

(73) Assignee: Trimble Navigation Limited, Sunnyvale, CA (US)

( * ) Notice: Subject to any disclaimer, the term of this patent is extended or adjusted under 35 U.S.C. 154(b) by 133 days.

(21) Appl. No.: 11/885,792

(22) PCT Filed: Apr. 17, 2006

(86) PCT No.: PCT/US2006/014519

§ 371 (c)(1),
(2), (4) Date: Sep. 6, 2007

(87) PCT Pub. No.: WO2006/113689

PCT Pub. Date: Oct. 26, 2006

(65) Prior Publication Data

US 2008/0166011 A1 Jul. 10, 2008

(51) Int. Cl.
*G01S 5/14* (2006.01)
(52) U.S. Cl. .................................. 342/357.15
(58) Field of Classification Search ............. 342/357.15
See application file for complete search history.

(56) References Cited

U.S. PATENT DOCUMENTS

| D312,263 | S | 11/1990 | Charles |
| 5,473,474 | A | 12/1995 | Powell |
| 5,517,419 | A | 5/1996 | Lanckton et al. |
| 5,995,041 | A | 11/1999 | Bradley et al. |
| 6,169,881 | B1 | 1/2001 | Astrom et al. |
| 6,646,818 | B2 | 11/2003 | Doi |
| 6,865,484 | B2 | 3/2005 | Miyasaka et al. |
| 2003/0176970 | A1 | 9/2003 | Lin |
| 2005/0046614 | A1 | 3/2005 | Akano |

OTHER PUBLICATIONS

R. Hicks et al., Reflective Surfaces as Computational Sensors, undated, five pages.
D. Lu et al, All Sky Imaging Observations in Visible and Infrared Waveband for Validation of Satellite Cloud and Aerosol Products, undated, one page.
Addendum to Water Quality Monitoring Technical Guide Book: Chapter 14 Stream Shade and Canopy Cover Monitoring Methods, Ver. 2.0, undated, thirty-five pages.
T. Pajdla, ICCV 2003 Course on Omnidirectional Vision, 2003, eighty pages.

*Primary Examiner*—Thomas H Tarcza
*Assistant Examiner*—Fred H Mull
(74) *Attorney, Agent, or Firm*—Bruce D Riter

(57) ABSTRACT

In accordance with embodiments of the invention, a skyward-looking sensor enables classification of points in its hemispherical field of view as either sky, partial sky or not sky, which in turn enables determination from data supplied by the GNSS receiver of whether each satellite in the GNSS antenna's field of view is in a region of sky, partial sky or not sky. Pseudrange and phase data from GNSS satellites determined to be in a region of sky can be considered reliable and used with confidence in a positioning solution. Pseudrange and phase data from GNSS satellites determined to be in a region of partial sky can be considered suspect and can therefore only contribute to a position solution with limited confidence and decreased accuracy. Pseudorange and phase data from GNSS satellites determined to be in a region of no sky can be considered unreliable and excluded from use in a positioning solution.

29 Claims, 11 Drawing Sheets

ENHANCED GNSS SIGNAL PROCESSING

TECHNICAL FIELD

The present invention relates to the field of Global Navigation Satellite Systems. More particularly, the present invention relates to selection for processing of GNSS signals from satellites in view of a receiver.

BACKGROUND ART

Global Navigation Satellite Systems (GNSS) include the Global Positioning System (GPS), Glonass, and the proposed Galileo system.

FIG. 1 illustrates a typical prior-art problem with GNSS signal reception. The antenna of a GNSS receiver such as antenna 105 is disposed for receiving signals from satellites such as satellites 3, 7, 8, 10, 12, 22. Reception of signals from satellites in line-of-sight view of antenna 105 is generally good. Signals received from satellites blocked by obstructions such as building 110 and tree canopy 115 are attenuated and distorted. These obstructions can also cause signal refraction and multipath reception at the antenna due to reflections within the canopy. Distorted signals degrade the accuracy of GNSS fixes such as fixes of position, time and velocity determined from the received signals.

Various techniques are used to reduce multipath reception from typical reflectors. GPS antenna assemblies are known having choke ring devices which attenuate signals arriving at the antenna from low angles near the horizon or even from angles below the plane of the antenna. It is known for GPS antennas to employ circularly polarized antenna elements which may attenuate a multipath signal if the reflection truly reverses the polarization. GPS receivers also use software algorithms to attenuate multipath signals. Such techniques have not been found effective in the case of signals passing through or near typical obstructions found in field environments such as canopy in which the signal distortions do not follow predicted models defining multipath behavior.

Obstructions passing through the field of view of the GPS antenna may affect only a subset of the available GPS satellite signals. However, these aforementioned methods of multipath mitigation are not satisfactory since they cannot identify specific GPS satellite signals which are affected by passing obstructions, nor can they identify specific GPS satellite signals which are not affected by passing obstructions.

Methods and apparatus for improved selection of GNSS satellite signals are needed.

SUMMARY OF THE INVENTION

Embodiments in accordance with the present invention employ wide-angle optics such as a hemispherical, fisheye, skyward-looking lens to focus rays onto a detector. Acquired images are evaluated to determine which regions of the GNSS antenna's field of view have direct line of sight to the sky and which regions of the antenna's field of view are partially or highly obstructed by nearby objects. This makes it possible to determine specifically which GNSS satellites are in direct line-of-sight view of the antenna, which GNSS satellites are only partially visible to the antenna and whose signal may thus be attenuated or refracted, and which GNSS satellites are completely obstructed and are not in line-of-sight view of the antenna. Signals received from individual GNSS satellites are classified according to the degree to which each is affected by physical obstructions, signal attenuation and multipath reception.

In accordance with an embodiment of the invention: (1) a hemispherical fisheye lens and accompanying imaging device are oriented such that they are fixed with respect to, and in the same plane as, the antenna element in a nearby or collocated GNSS antenna; and (2) the azimuthal orientiation with respect to a reference is known, such as from an estimated velocity vector computed by the accompanying GNSS receiver, or from a heading angle provided by an accompanying navigation system. With the orientation relationship between the GNSS antenna element and the fisheye lens and imaging device known, it is possible to relate each point in the imager's hemispherical field of view to a GNSS satellite Azimuth and Elevation angle.

Methods and apparatus in accordance with embodiments of the invention may provide for: acquiring an image representing surroundings of a GNSS antenna, determining whether an expected location of a GNSS satellite corresponds to a region of the image representing unobstructed sky, and classifying as usable the signals received from a GNSS satellite whose expected location corresponds to a region of the the image represeenting unobstructed sky.

Additional features and embodiments in accordance with the invention are described in more detail below, with reference to the accompanying drawing figures.

DETAILED DESCRIPTION

The following terms are intended to have the meanings indicated, unless otherwise indicated by the context:

GALILEO comprises the Galileo satellite navigation system planned for deployment by the European Space Agency.

GLONASS comprises the Glonass satellite navigation system currently operated by the Russian Federation Ministry of Defense.

GNSS (Global Navigation Satellite System) comprises generically the GPS, GLONASS and GALILEO systems, similar satellite-based navigation systems which may from time to time become operational, and pseudolite systems.

GPS comprises the NAVSTAR Global Positioning System deployed by the United States Department of Defense, as it currently exists and as it may exist with future modernization.

A pseudolite, also called a pseudo-satellite, is a transmitter of GNSS-like signals. A pseudolite is typically terrestrial.

A satellite is a transmitter of GNSS signals, and is intended to include a pseudolite.

Figure 1:
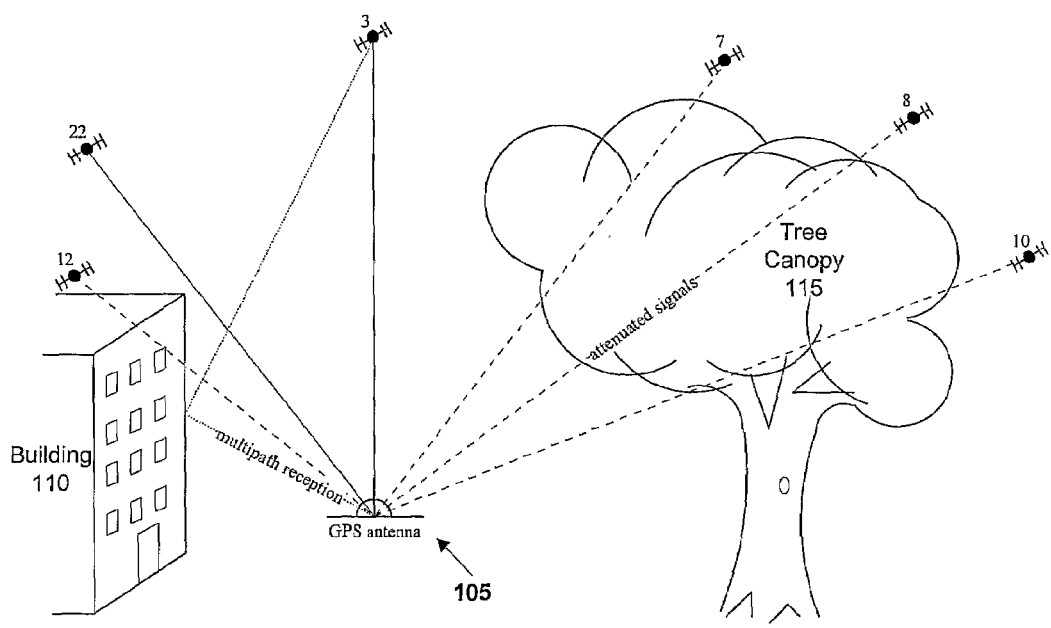
FIG. 1 illustrates a typical prior-art problem with GNSS signal reception.
Figure 2:
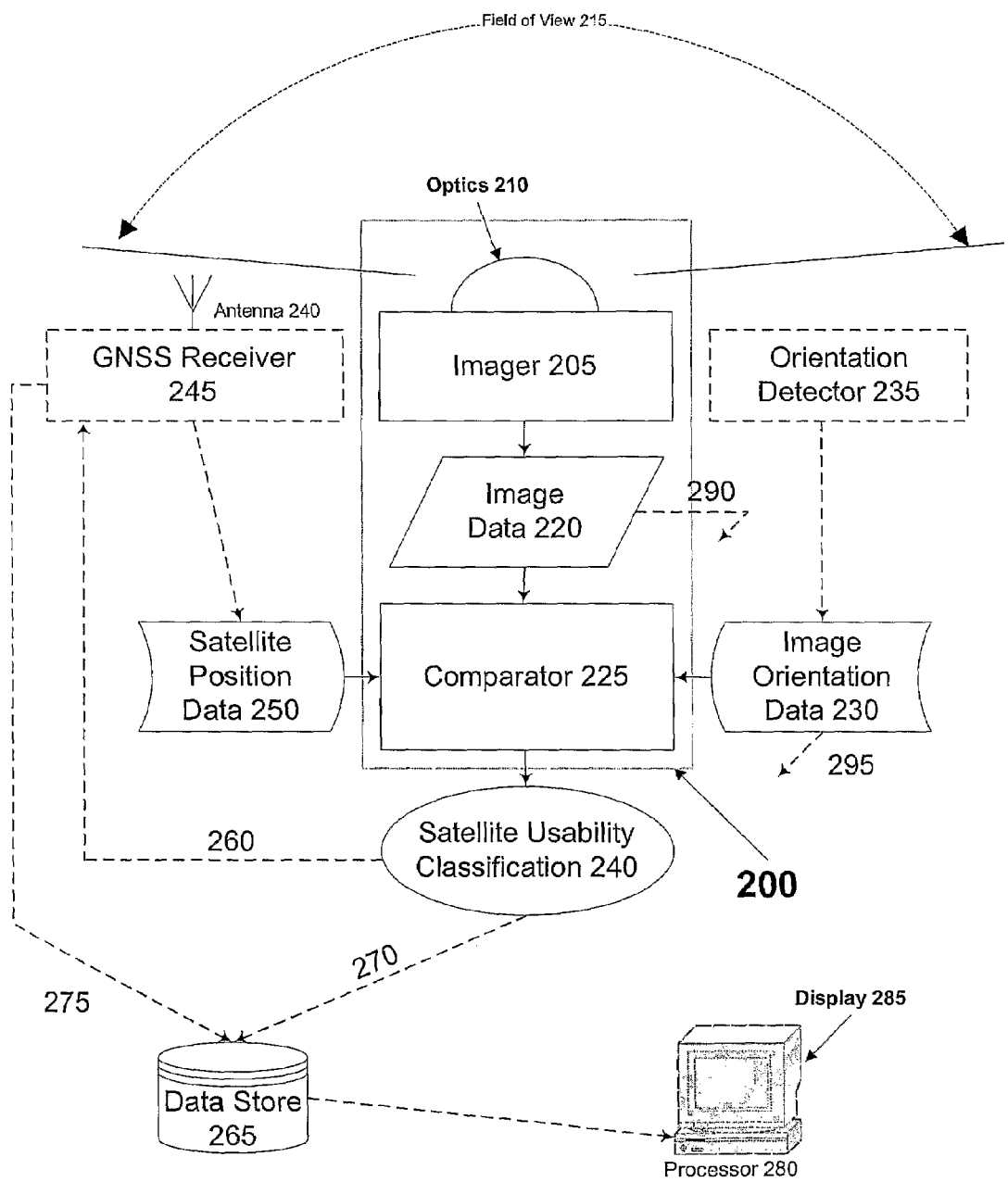
FIG. 2 schematically illustrates an arrangement in accordance with an embodiment of the invention.

FIG. 2 schematically illustrates an arrangement in accordance with an embodiment of the invention. Imaging apparatus 200 includes an imager 205 with optics 210. Optics 210 has a wide-angle field of view 215. Imager 205 acquires an image and provides the image in the form of image data 220 to a comparator 225. Comparator 225 also receives image orientation data 230 from an orientation detector 235 or other source as discussed below.

Imaging apparatus 200 is preferably sited near the antenna 240 of a GNSS receiver 245 so that the aquired image represents surroundings of antenna 240. GNSS receiver 245 receives ephemeris data from the GNSS satellites or from other sources as is known in the art. The ephemeris data describes the orbits of the GNSS satellites so that at any given time the respective position of each GNSS satellite can be determined. Whether from GNSS receiver 245 or from another source, satellite position data 250 is supplied to comparator 225.

Comparator 225 thus is provided with the image represented by image data 220, with image orientation data 230 so that azimuthal orientation of the image can be determined, and with satellite position data so that an expected position of each satellite can be determined.

These information sources enable the expected position of each satellite to be compared with a corresponding region of the image. Usability of the signals of each satellite is classified accordingly. For example, if the expected satellite location corresponds to a region of the image representing unobstructed sky, the satellite's signals are classified as usable; if not, the satellite's signals are classified as non-usable or suspect. Comparator 225 provides satellite usability classification data 255 indicating for each satellite whether its signals are, for example, usable or suspect or non-usable. Classification is described below in more detail.

Figure 3:
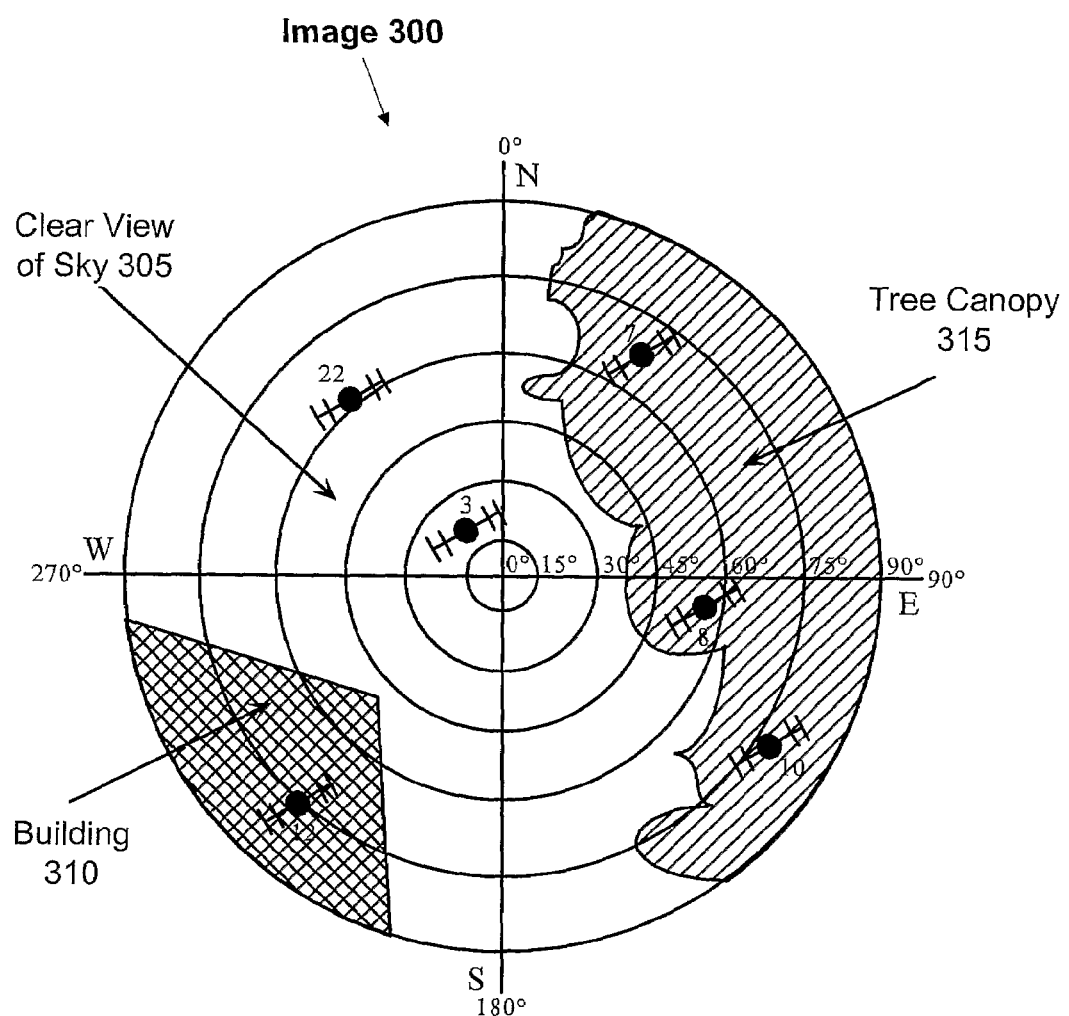
FIG. 3 shows a composite image in accordance with an embodiment of the invention.

FIG. 3 shows a composite image produced in accordance with an embodiment of the invention. Imager 200 produces for example an image 300 having a region 305 representing an unobstructed, clear view of sky, a region 310 representing a building and a region 315 representing a tree canopy 315. Overlaid on image 300 is a grid showing azimuthal orientation of the image with respect to North, South, East and West, and indicating elevation angles from horizon to vertical. Also overlaid on image 300 are the expected locations of satellites 3, 7, 8, 10, 22 and 22 at the time of image acquisition, calculated for example from satellite ephemeris data.

Examination of FIG. 3 shows that regions of composite image 300 corresponding to the expected positions of satellites 3 and 22 represent unobstructed sky. A GNSS antenna located near imaging apparatus 200 can be assumed to have a line-of-sight view of satellites 3 and 22 and their signals can be classified as usable. The region of image 310 corresponding to the expected position of satellite 12 represents a building. A GNSS antenna located near imaging apparatus 200 can be assumed to have its view of satellite 12 blocked. A signal received from satellite 12 can thus be classified as unusable due to likelihood of multipath reception. The region of image 310 corresponding to the expected position of satellites 7, 8 and 10 represents tree canopy. A GNSS antenna located near imaging apparatus 200 can be assumed to have its view of satellites 7, 8 and 10 at least partially blocked. A signal received from satellites 7, 8 and 10 can thus be classified as suspect due to likelihood of signal attenuation and/or refraction.

Attention is again directed to FIG. 2. For real-time GNSS processing, satellite usability classification data 255 are supplied to GNSS receiver 245 as indicated by arrow 260. GNSS receiver 245 can thus calculate fixes giving preference to satellite signals in accordance with the satellite usability classification. A weighted dilution-of-precision (DOP) computation can be used to classify satellite usability, e.g., ranging from binary (such as usable and unusable) to three-level ranking (such as usable, unusable, and suspect) to multi-level ranking (such as a scale of reliability ranging from 1 to 10 or more). GNSS receiver 245 can also estimate quality of a fix based on the usability classification of signals used to calculate the fix.

Satellite usability classification data 255 can be passed to a data store 265 as indicated by arrow 270. Raw and/or pre-processed GNSS data from receiver 245 can also be passed for storage as indicated by arrow 275. A processor 280 calculates fixes from the stored GNSS data, giving preference to satellite signals in accordance with the satellite usability classification. Processor 280 may include a display screen 285 or other suitable element for displaying images and/or data. Processor 280 can be for example a laptop computer physically located near receiver 245 or can be a computer system at a remote site such as an office environment where post-processing is to be performed.

Image data 220 and image orientation data 230 can also be passed to data store 265 as indicated respectively by arrows 290 and 295. Processor 280 can display a representation of image data 220 and image orientation data 230 and expected satellite positions for review by a human user. The display can be in the form shown in FIG. 3 or in any other appropriate format. Processor 280 can be used to calculate GNSS fixes in real-time and/or in post-processing mode. A human user can review the displayed images and/or data and make selections of which satellite data to use in computing fixes. A human user may, for example, wish to enable the use of one or more satellite signals classified as suspect and/or unusable.

Imager 205 and optics 210 can be implemented with any suitable imaging technology, including but not limited to catadioptric sensors. Catadioptric sensors are imaging sensors built with combinations of mirrors (catoptrics) and lenses (dioptrics). An advantage of using mirrors with cameras is that by using a curved mirror a wide field of view can be obtained.

Imager 205 uses any combination of visible or near-visible imaging technology. A thermal imager is suitable for detecting sky versus other obstructions. Whether visible-light imaging or thermal imaging, or both, is preferable can depend on a variety of factors including cost, relative sensitivity to surrounding environmental conditions, and image-processing complexity. A visible-light camera, which can be tuned to be sensitive to one or more narrow bands of the visible spectrum, may be better at detecting a full sun disk or warm pockets of atmosphere on a cold day, conditions which may be more difficult to distinguish using thermal images. Visible-light images may be more easily interpreted than thermal images during transition from night to day and from day to night. Visible-light images may be more easily interpreted than thermal images created with rain droplets on the imaging optics, though suitable optical surface coatings can decrease surface tension of water on the optics and thus mitigate image-processing issues related to water droplets. Thermal imaging may allow simpler image processing than visible-light images. However, knowledge of local position and time of day (from the GNSS receiver) and the sun's computed or estimated position in the sky can mitigate some of the image processing issues. Imager 205 can be, for example, a conventional camera such as a digital camera having an image sensor responsive to light waves over one or more visible and/or invisible frequency bands and producing a digital image file for each image frame. Visible-wavelength digital camera can be used, as can thermographic infrared imaging cameras. Such cameras are commercially available from a variety of sources.

Optics 210 can be a wide-angle lens, a hemispherical fish-eye lens, a panoramic imaging lens (examples are described in U.S. Pat. Nos. 5,473,474 and 6,646,818 and elsewhere), a catadioptric lens assembly or other optics having a wide field of view. A panoramic imaging lens, for example as commercially available from the 0-360.com division of Bellissimo, Inc., Carson City, Nev. USA, may also be used where the overhead view is assumed to be unobstructed.

Orientation detector 235 can take any of a variety of forms. GNSS receiver 245 can serve as orientation detector 235 by producing a velocity vector when receiver 245 is in motion. The velocity vector can be related to orientation of imager 205, such as when receiver 245 and imager 205 are mounted on a vehicle in a known orientation relative to an axis of vehicle motion. A position and orientation system (POS) can serve as orientation detector 235, supplying an output signal indicative of the instantaneous orientation of the imager when in motion. Position and orientation systems are available commercially from Applanix, a Trimble company, of Richmond Hill, Ontario, Canada. Any other suitable source of image orientation data may be used, including but not limited to automatic or manual entry of orientation data from a magnetic compass or manual orientation of the imager 205 to a magnetic compass heading such as North.

Comparator 225 can be implemented in a variety of ways, including but not limited to software instructions executed on a processor within imaging apparatus 200, on a processor within GNSS receiver 245, and/or on a separate processor 280.

Figure 4:
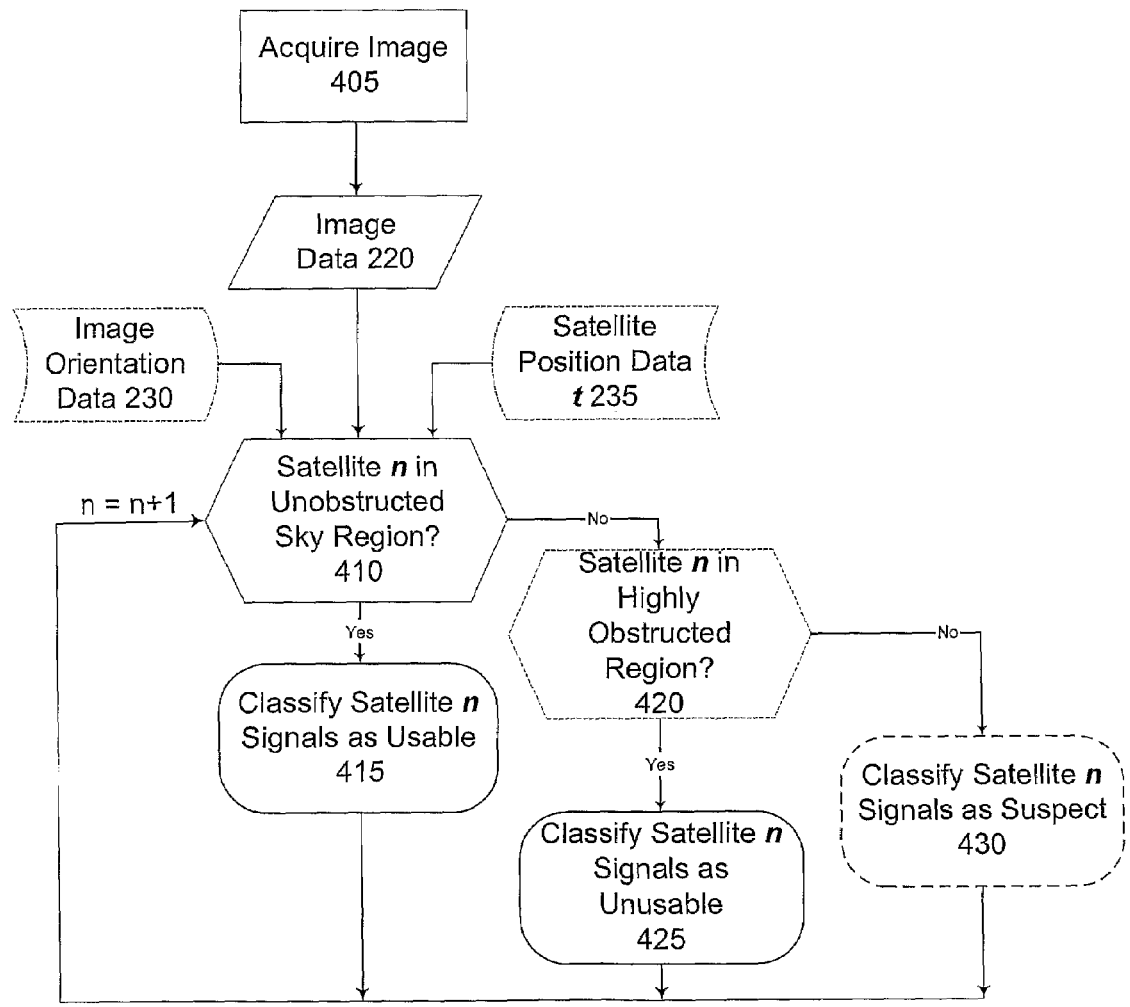
FIG. 4 shows a flow chart in accordance with an embodiment of the invention.

FIG. 4 shows a processing flow chart 400 of an imaging apparatus 200 in accordance with an embodiment of the invention. An image is acquired at 405, producing image data 220. Image data 220, image orientation data 230 and time-tagged (t) satellite position data 235 are processed at 410 to determine whether the expected location of a satellite n corresponds to an image region representing unobstructed sky. If yes, signals from satellite n are classified as usable at 415. If no, further evaluation is optionally performed at 420 to determine whether the expected location of satellite n corresponds to an image region representing highly-obstructed sky, such as a building, rather than partially-obstructed sky, such as signal-attenuating tree canopy. If yes, signals from satellite n are classified as unusable at 425. If no, signals from satellite n are classified as suspect. The example given in FIG. 4 shows three possible classifications: usable, unusable, and suspect. Other classifications can be used as desired, ranging from binary (usable, unusable) to multi-level ranking (such as a scale of reliability ranging from 1 to 10 or more). A satellite is considered to be highly obstructed, for example, when the obstruction in the image region exceeds a predetermined size.

Processing at 410 can be carried out using conventional image analysis techniques or otherwise. Processing at 410 can include evaluation of picture elements (pixels) of image data 220 individually or in groups to distinguish colors, to distinguish bright and dark regions of the image, to distinguish temperatures, to distinguish shapes, and/or to distinguish other image characteristics. For example, sky is blue and tree canopy is green, buildings generally have sharp edges while tree canopies have diffused edges, sky and clouds are generally colder than trees and buildings. Image-recognition and image-matching techniques can be employed. Manual evaluation and marking of displayed images can be used to assist recognition algorithms in a "learning" process; for example, a first image of a series can be manually marked to indicated regions of sky, clouds, trees and buildings, and comparator 225 can use image-matching techniques to identify similar regions in subsequent images of the series. Heuristic techniques can be applied so that processing is refined experientially.

Figure 5:
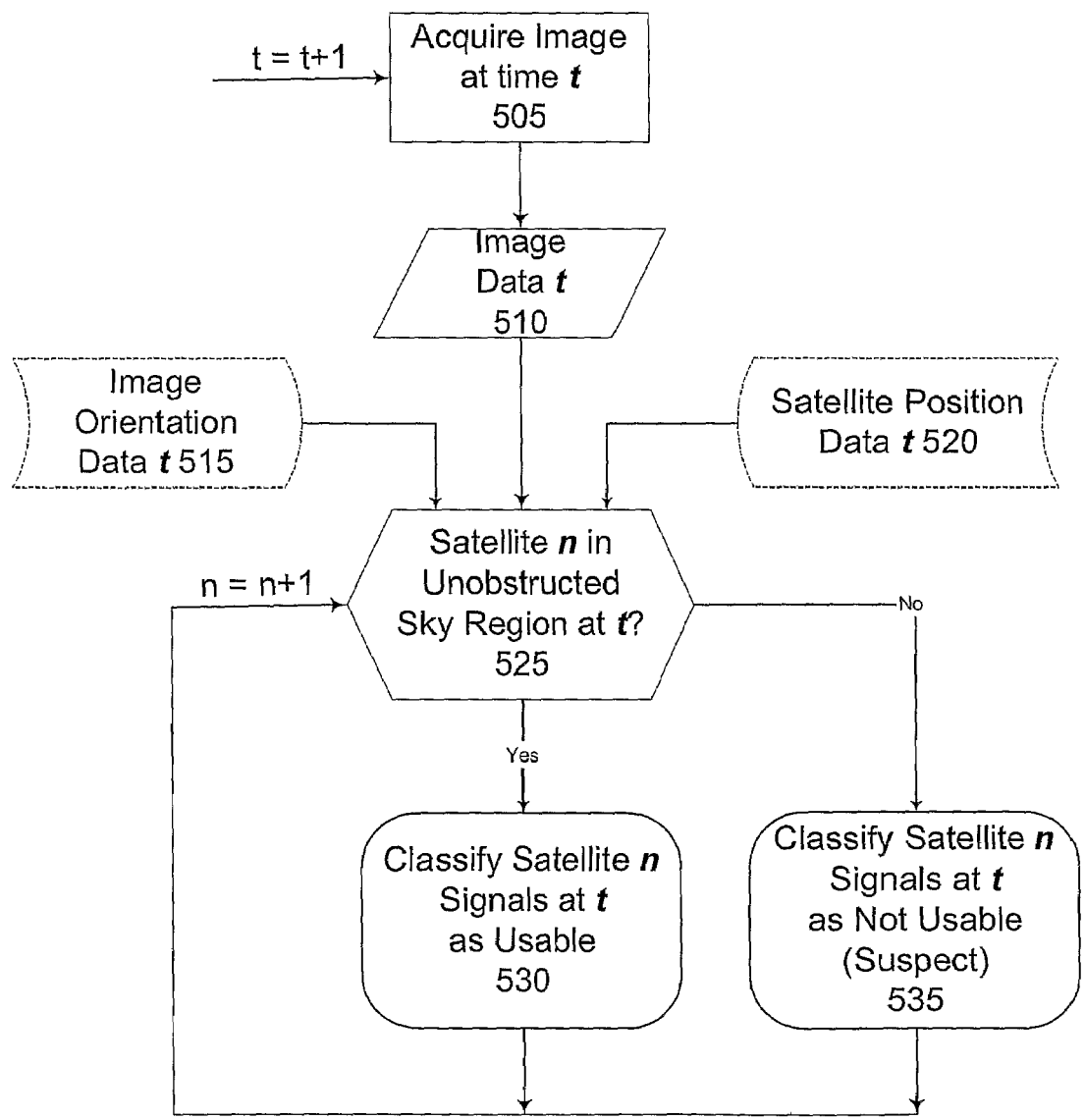
FIG. 5 shows a flow chart in accordance with a further embodiment of the invention.

FIG. 5 shows a flow chart in accordance with a further embodiment of the invention. As signals received from GNSS satellites are time sensitive, the image data used to determine usability of satellite signals can be updated as needed to assure current classification. An image can thus be acquired from time to time or periodically, such as at a rate of 1 Hz. The rate of image acquisition can be suited to the expected rate of change of the surroundings of the GNSS receiver. For a static survey receiver, change may occur slowly, though a passing vehicle may cause multipath reception of a satellite's signal. For a mobile receiver, the surroundings may change continuously and significantly, such as when the mobile receiver passes under a tree canopy or through an urban canyon.

Referring to FIG. 5, an image is acquired at a time t as shown at 505 and corresponding image data 510 is produced for time t. Acquisition is repeated at updated times t=t+1 as appropriate. Time-tagged image orientation data 515 and time-tagged satellite position data 520 are also acquired. At 525, the data are evaluated to classify the signals of each satellite at time t as appropriate. In the example of FIG. 5, satellite signals are classified as usable or unusable, though other classification schemes can be employed. If the expected location of satellite n corresponds to an unobstructed sky region of the image at time t, the satellite's signals are classified as usable at 530. Otherwise, the satellite's signals are classified as not usable at 535. The evaluation is repeated for each satellite whose expected location is above the horizon at time t.

Figure 6:
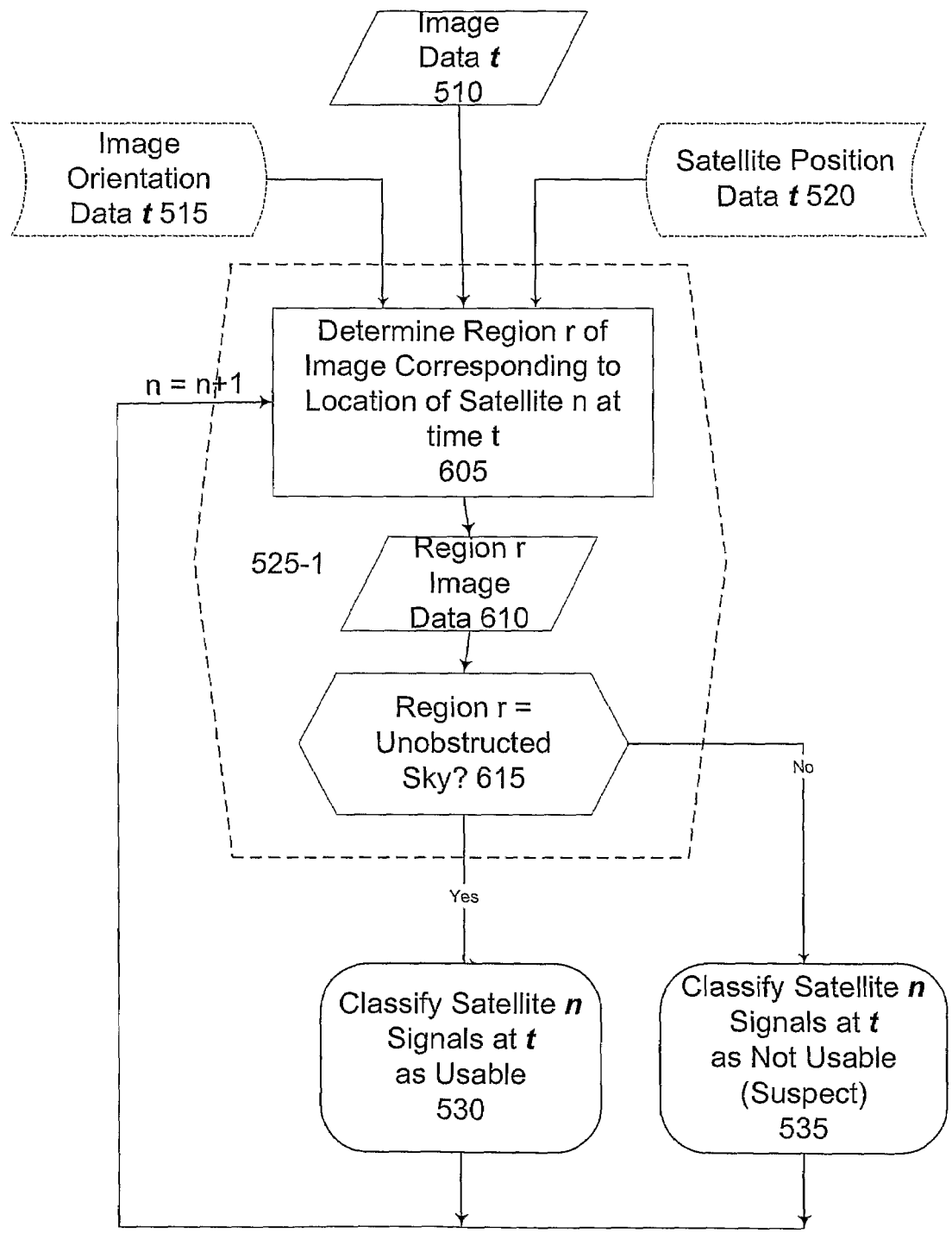
FIG. 6 shows in more detail an embodiment of a portion of the flow chart of FIG. 5.

Processing of the entire image is not necessary to determine usability of satellite signals. FIG. 6 shows in more detail an embodiment of a portion of the flow chart of FIG. 5 labeled 525-1. At 605 a region r of the image corresponding to location of satellite n at time t is determined. The region can be just a few pixels surrounding the expected location of the satellite or a somewhat larger image patch including the expected location of the satellite. Processing burden is thereby less than would be needed to evaluate the entire image. Image data 610 for region r is evaluated at 615 and each satellite is classified appropriately.

Figure 7:
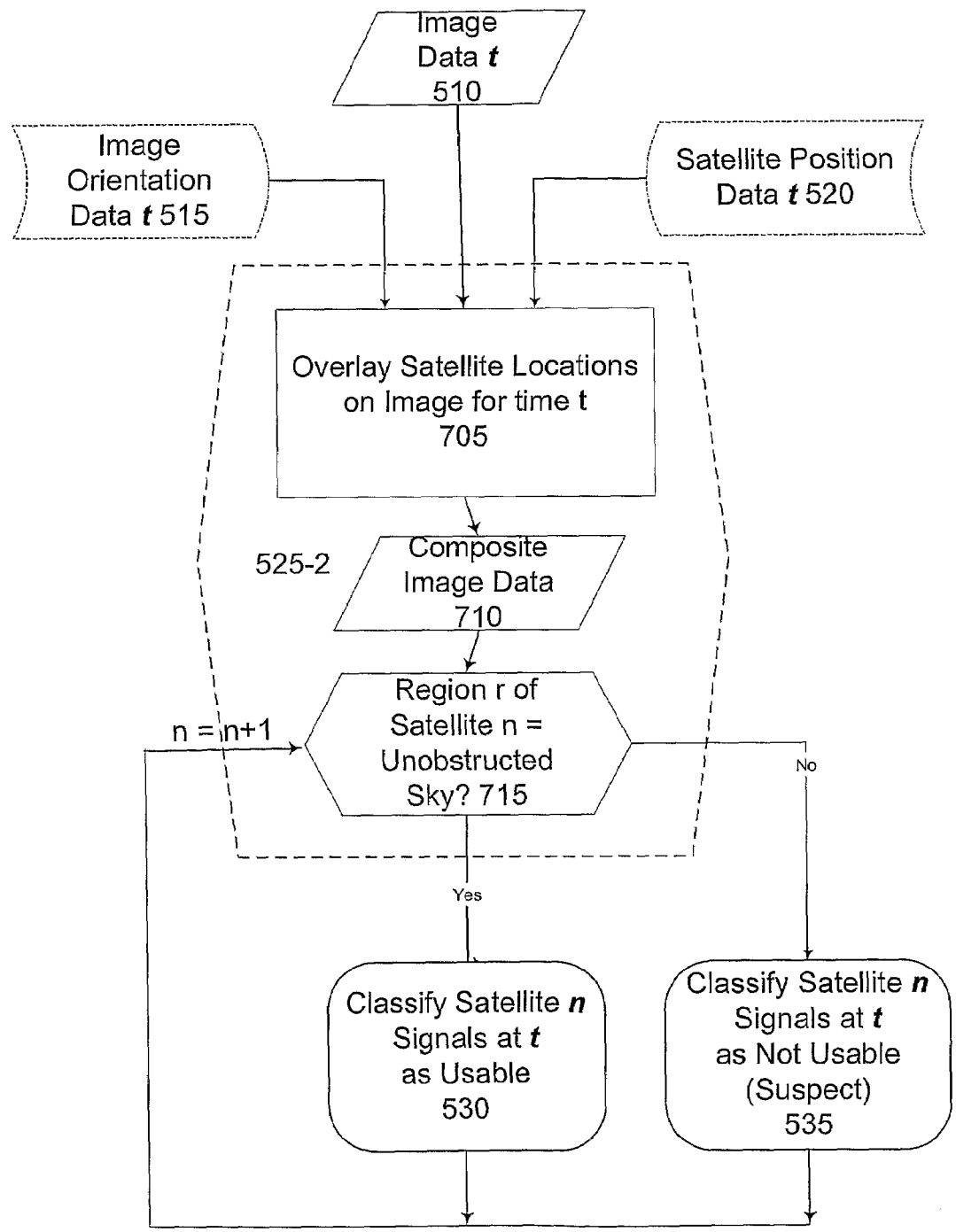
FIG. 7 shows in more detail a further embodiment of a portion of the flow chart of FIG. 5.

FIG. 7 shows in more detail an embodiment of a portion of the flow chart of FIG. 5 labeled 525-2 in which a composite image is prepared, for example a composite image as illustrated in FIG. 3. Image data 510, image orientation data 515 and satellite position data 520 for time t are acquired and, at 705, the expected satellite locations are overlaid on the image to produce composite image data 710. At 715 the composite image data are evaluated and each satellite is classified appropriately.

Figure 8:
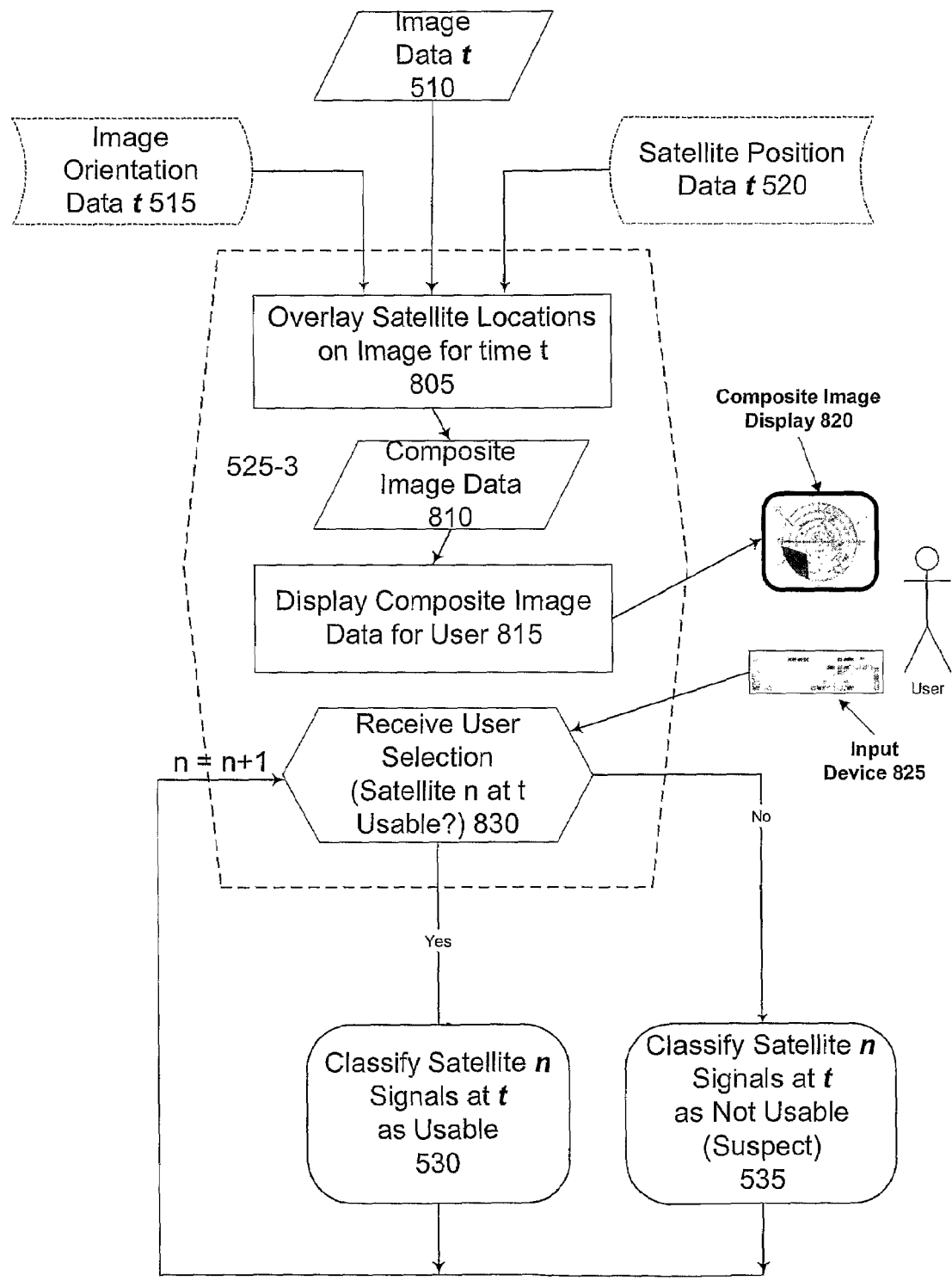
FIG. 8 shows in more detail a further embodiment of a portion of the flow chart of FIG. 5.

FIG. 8 shows in more detail an embodiment of a portion of the flow chart of FIG. 5 in which a composite image is displayed for manual selection of satellites, for example a composite image as illustrated in FIG. 3. Image data 510, image orientation data 515 and satellite position data 520 for time t are acquired and, at 805, the expected satellite locations are overlaid on the image to produce composite image data 810. At 815 the composite image data are displayed for manual examination on a composite image display 820. A human user enters satellite classifications via input device 825. At 830 the user selections are received and each satellite is classified accordingly. Composite image display 820 may also indicate a proposed classification for the human user to confirm or override, which may be useful for example in post-processing to examine the effect of including, excluding or de-weighting the signals from a satellite.

Figure 9:
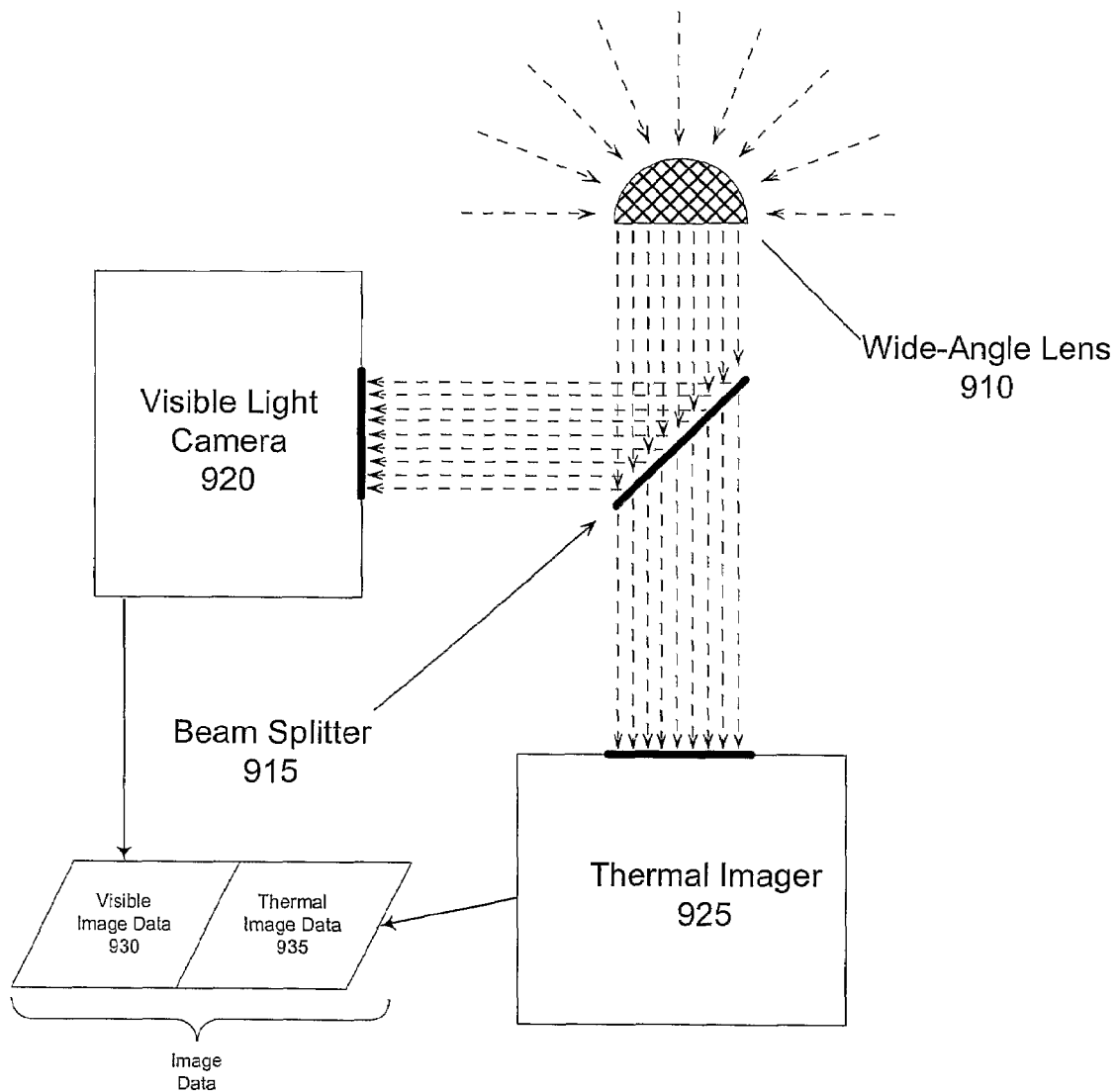
FIG. 9 shows an imaging arrangement in accordance with an embodiment of the invention.

Images of more than one frequency band, such as a visible-light image and a thermal infrared image, can be acquired simultaneously over the same field of view. FIG. 9 shows an imaging arrangement with this capability in accordance with an embodiment of the invention. A wide-angle lens 910 or other optics having a suitably wide field of view directs radiation to a beam splitter 915 which splits the incoming radiation. A portion of the radiation is directed to a visible light imager such as a camera 920, and a portion of the radiation is directed to a thermal imager 925. Camera 920 produces visible image data 930 while thermal imager 925 produces thermal image data 935. Visible image data 930 and thermal image data 935 of the scene captured by lens 910 can be used to enhance classification of satellite signals by providing further distinguishing characteristics.

Figure 10:
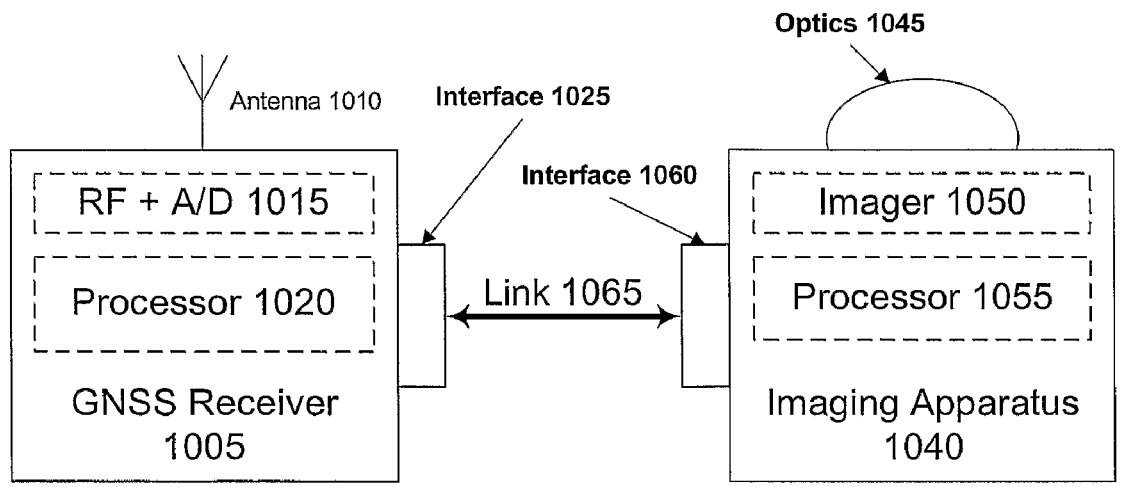
FIG. 10 shows an imaging apparatus linked with a GNSS receiver in accordance with an embodiment of the invention.

FIG. 10 schematically illustrates an imaging apparatus 1040 linked with a GNSS receiver 1005 in accordance with an embodiment of the invention. GNSS receiver 1005 can be a typical prior-art receiver having an antenna 1010, analog signal processing electronics with analog-to-digital converter 1015, a digital signal processor 1020, and a communications interface 1025. Imaging apparatus 1040 has optics 1045, an imager 1050, an image processor 1055 and a communications interface 1060. Communications link 1065 enables communication between GNSS receiver 1005 and imaging apparatus 1040. Antenna 1010 is preferably sited near imaging apparatus 1040 such that images acquired by imager 1050 through the field of view of optics 1045 substantially represent the surroundings of antenna 1010. Processor 1055 receives satellite position data and image orientation data (such as a velocity vector) from GNSS receiver 1005 via communications link 1065, receives image data from imager 1050, determines the usability of GNSS satellite signals, and suppplies processor 1020 with satellite usability classification data. GNSS receiver 1005 can be a typical prior-art receiver except that processor 1020 is programmed to take account of satellite usability classification data when computing GNSS fixes, such as by giving preference to signals from GNSS satellites determined by imaging apparatus 1040 to be in line-of-sight view of antnna 1010.

Figure 11:
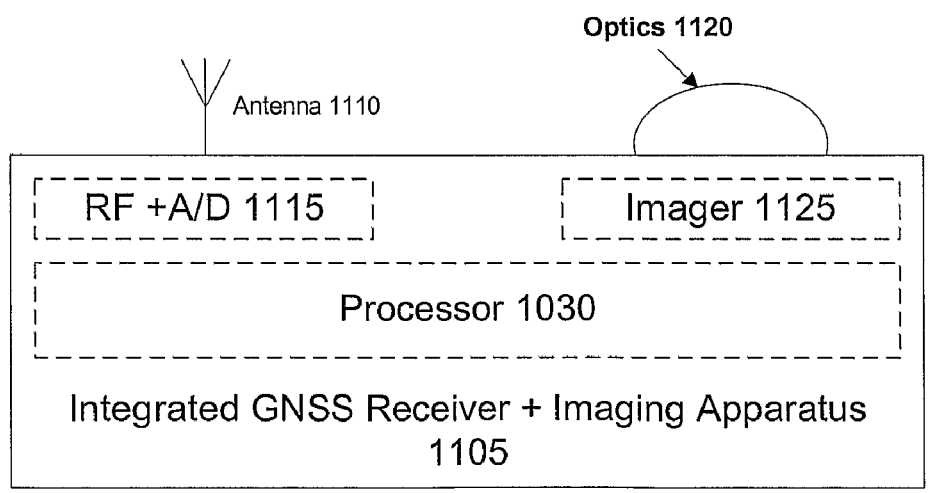
FIG. 11 shows an integrated imaging apparatus and GNSS receiver in accordance with an embodiment of the invention.

FIG. 11 schematically illustrates an integrated imaging apparatus and GNSS receiver 1105 in accordance with an embodiment of the invention having a GNSS antenna 1110, analog signal processing electronics with analog-to-digital converter 1115, optics 1120, an imager 1125, and a digital signal processor 1030. With the GNSS receiver and imaging apparatus packaged together in an integrated unit, antenna 1110 and optics 1120 are in a known and fixed relationship to one another so that the field of view of optics 1120 substantially corresponds to the field of view of antenna 1110. Processor 1030 communicates with signal electronics 1115 for processing of received GNSS satellite signals and with imager 1125 for processing of optical images. Processor 1030 is programmed to generate satellite usability classification data, and to take account of the satellite usability classification data when computing GNSS fixes such as by giving preference to signals from GNSS satellites determined to be in line-of-sight view of antenna 1010.

Figure 12:
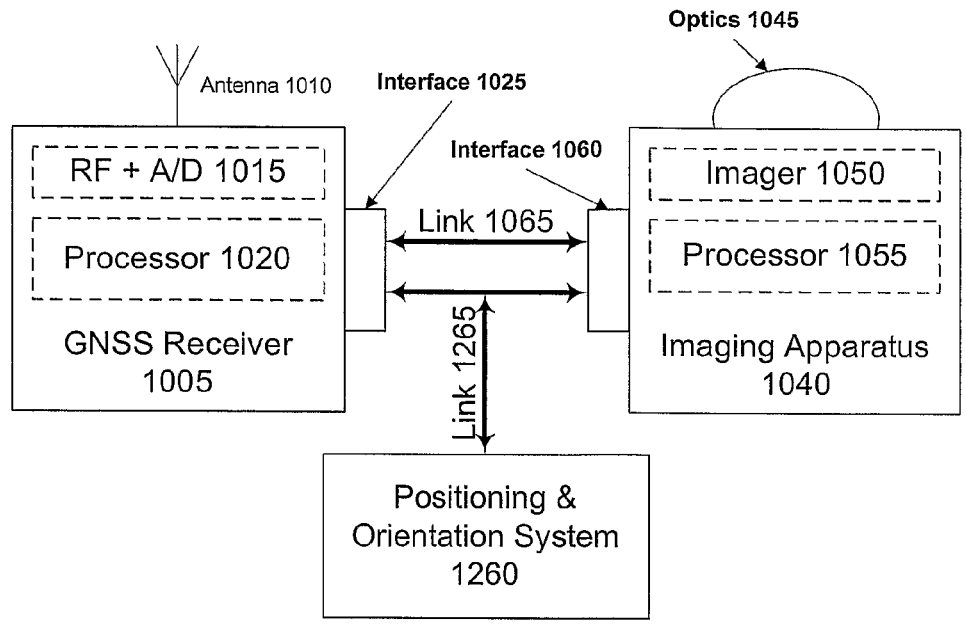
FIG. 12 shows imaging apparatus linked with a GNSS receiver and a positioning and orientation system in accordance with an embodiment of the invention.

FIG. 12 schematically illustrates imaging apparatus 1040 linked with a GNSS receiver 1005 and with a positioning and orientation system 1260 in accordance with an embodiment of the invention. The arrangement is substantially as shown in FIG. 10 except that a positioning and orientation system 1260 communicates with GNSS receiver 1005 and with imaging apparatus 1040 via a communications link 1265. Communications link 1265 is preferably bi-directional so that the positioning and orientation system 1260 can supply orientation data to GNSS receiver 1005 and/or to imaging apparatus 1040. Positioning and orientation system 1260 provides positioning and orientation information to supplement GNSS fixes from GNSS receiver such as during periods when antenna 1010 is blocked from receiving signals. Positioning and orientation system 1260 also provides orientation information for use in orienting the images acquired by imager 1050.

Figure 13:
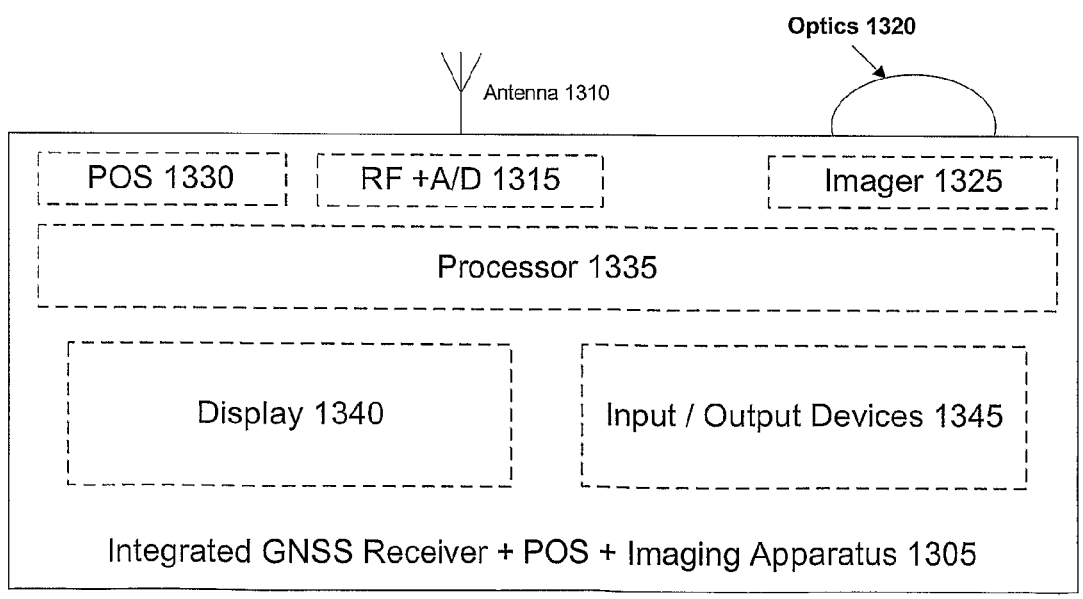
FIG. 13 shows an integrated imaging apparatus and GNSS receiver with positioning and orientation system in accordance with an embodiment of the invention.

FIG. 13 schematically illustrates an integrated system 1305 with imaging apparatus and GNSS receiver with positioning and orientation subsystem in accordance with an embodiment of the invention. System 1305 has a GNSS antenna 1310, analog signal processing electronics with analog-to-digital converter 1315, optics 1320, an imager 1325, a positioning and orientation subsystem 1330, and a digital signal processor 1335. Antenna 1310 and optics 1320 are in a known and fixed relationship to one another so that the field of view of optics 1320 substantially corresponds to the field of view of antenna 1310. Processor 1335 communicates with signal electronics 1315 for processing of received GNSS satellite signals, with positioning and orientation subsystem 1330 and with imager 1325 for processing of optical images. Processor 1335 is programmed to generate satellite usability classification data, and to take account of the satellite usability classification data when computing GNSS fixes such as by giving preference to signals from GNSS satellites determined to be in line-of-sight view of antenna 1310.

Those of ordinary skill in the art will realize that the description of embodiments of the present invention is illustrative only and is not intended to be in any way limiting. Further embodiments will readily suggest themselves to such skilled persons having the benefit of this disclosure. In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or can take the form of a stand-alone device. The processes can be implemented as instructions executed by such hardware, by hardware alone, or by any combination thereof. The software may be stored on a program storage device readable by a machine. Computational elements, such as image-processing filters and banks of filters, can be readily implemented using an object-oriented programming language such that each required filter is instantiated as needed. Filters can be implemented as hardware only, requiring no software, e.g., optical filters.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

Methods in accordance with embodiments of the invention may be implemented using a data processing computer such as a personal computer, workstation computer, mainframe computer, or high-performance server preferably running a real-time operating system (RTOS) such as QNX, real-time Linux, ECOS, Trimble's "FastExec" or others, or an OS such as Microsoft® Windows® XP and Windows® 2000, available from Microsoft Corporation of Redmond, Wash., or Solaris® available from Sun Microsystems, Inc. of Santa Clara, Calif., or various versions of the Unix operating system such as Linux available from a number of vendors. Methods may also be implemented using a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Methods and apparatus in accordance with embodiments of the invention include but are not limited to:

1. A method for processing GNSS signals, comprising:
   a. Acquiring an image representing surroundings of an antenna,
   b. Determining whether an expected location of a GNSS satellite corresponds to a region of the image representing unobstructed sky,
   c. Classifying as usable signals received from a GNSS satellite whose expected location corresponds to a region of the image representing unobstructed sky,
2. The method of 1, wherein step b. comprises determining azimuthal orientation of the image.
3. The method of 1 or 2, wherein step b. comprises classifying at least one region of the image as unobstructed sky.
4. The method of one of 1-3, wherein step b. comprises determining an expected location of a GNSS satellite and determining whether the expected location corresponds to a region of the image classified as unobstructed sky.
5. The method of one of 1-4, wherein step c comprises: classifying as usable signals received from a GNSS satellite whose expected location corresponds to a region of the image representing unobstructed sky and classifying as not usable signals received from a GNSS satellite whose its expected location corresponds to a region of the image not representing unobstructed sky.
6. The method of one of 1-5, further comprising computing a fix using signals received from a GNSS satellite whose expected location corresponds to a region of the image representing unobstructed sky.
7. The method of one of 1-6, further comprising computing a fix using signals received from a GNSS satellite whose expected location corresponds to a region of the image not representing unobstructed sky.
8. The method of one of 1-7, wherein step a. comprises acquiring an image through a wide-angle optical collector aimed generally skyward from a position near the antenna.
9. The method of one of 1-8, wherein step a. comprises detecting energy in an least one infra-red frequency band.
10. The method of one of 1-9, wherein step a. comprises detecting energy in at least one visible-light frequency band.
11. The method of one of 1-10, further comprising: computing a fix using signals received exclusively from GNSS satellites whose respective expected locations correspond to regions of the image representing unobstructed sky, computing a fix using signals received from at least one GNSS satellite whose expected location corresponds to a region of the image not representing unobstructed sky, and comparing the fixes.
12. The method of one of 1-11, further comprising: displaying at least those portions of the image which correspond to expected locations of GNSS satellites.
13. The method of 12, further comprising receiving a user selection of whether to include signals received from any GNSS satellite when computing a fix.
14. Apparatus for processing GNSS signals, comprising:
   a. An imager to acquire an image representing surroundings of an antenna, and
   b. A comparator to determine whether an expected location of a GNSS satellite corresponds to a region of the image representing unobstructed sky, and to classify as usable signals received from a GNSS satellite whose expected location corresponds to a region of the image representing unobstructed sky.
15. The apparatus of 14, wherein the comparator takes account of azimuthal orientation of the image.
16. The apparatus of 14 or 15, further comprising an image analyzer which is capable of classifying as unobstructed sky a region of the image representing unobstructed sky.
17. The apparatus of 16, wherein the comparator determines an expected location of a GNSS satellite and determining whether the expected location corresponds to a region of the image classified as unobstructed sky.
18. The apparatus of one of 14-17, wherein the comparator classifies as usable signals received from a GNSS satellite whose expected location corresponds to a region of the image representing unobstructed sky and classifying as not usable signals received from a GNSS satellite whose its expected location corresponds to a region of the image not representing unobstructed sky.
19. The apparatus of one of 14-18, further comprising a processor to compute a fix using signals received from a GNSS satellite whose expected location corresponds to a region of the image representing unobstructed sky.
20. The apparatus of one of 14-18, further comprising a processor to compute a fix using signals received from a GNSS satellite whose expected location corresponds to a region of the image not representing unobstructed sky.
21. The apparatus of one of 14-20, wherein the imager comprises a wide-angle optical collector.
22. The apparatus of one of 14-21, wherein the imager comprises detector responsive to energy in at least one infra-red frequency band.
23. The apparatus of one of 14-22, wherein the imager comprises a detector responsive to energy in at least one visible-light frequency band.
24. The apparatus of one of 14-23, further comprising a processor to compute a fix using signals received exclusively from GNSS satellites whose respective expected locations correspond to regions of the image representing unobstructed sky, to compute a fix using signals received from at least one GNSS satellite whose expected location corresponds to a region of the image not representing unobstructed sky, and to compare the fixes.

25. The apparatus of one of 14-24, further comprising: a user interface to display at least those portions of the image which correspond to expected locations of GNSS satellites.

26. The apparatus of one of 14-24, further comprising a user interface to display at least those portions of the image which correspond to expected locations of GNSS satellites and to receive a user selection of whether to include signals received from any GNSS satellite when computing a fix.

27. The apparatus of one of 14-24, further comprising: a GNSS receiver responsive to signals from GNSS satellites received at the antenna for computing a fix from signals classfied by the comparator as usable.

28. The apparatus of 27, wherein the antenna is a component of the GNSS receiver.

29. The apparatus of 27, further comprising a position and orientation system to provide data to the comparator indicating orientation of the imager.

Embodiments of the present invention may offer advantages such as one or more of the following:

- Potentially decreased time to resolve individual GNSS satellite integer ambiguities for those satellites associated with reliable GNSS observables,
- Can be employed with stand-alone GNSS receivers.
- Can be used with aided navigation systems, where the orientation of the imaging device is fixed and the heading angle is known,
- Can be used with stationary GNSS base stations in locations with partial shading of GNSS satellites, while still providing observables data with high quality and reliability for those GNSS satellites in line-of-sight view to the GNSS antenna,
- Enables more reliable GNSS fixes,
- Enables more reliable measure of the quality of GNSS fixes [A weighted dilution-of-precision (DOP) computation can be used to classify satellite usability, e.g., ranging from binary (such as usable and unusable) to three-level ranking (such as usable, unusable, and suspect) to multi-level ranking (such as a scale of reliability ranging from 1 to 10 or more)],
- Can be integrated into a GNSS antenna,
- Can be integrated into a GNSS receiver,
- Can be integrated into a POS system,
- Enables improved GNSS performance in mobile mapping applications,
- Selective masking of GNSS satellites.

While embodiments and applications of the present invention have been shown and described, it will be recognized by those skilled in the art having the benefit of this disclosure that many more modifications than mentioned above are possible without departing from the inventive concepts herein.

The invention claimed is:

1. A method for processing GNSS signals, comprising:
   a. Acquiring an image representing surroundings of an antenna,
   b. Determining whether an expected location of a GNSS satellite corresponds to a region of the image representing unobstructed sky, and
   c. Classifying as usable signals received from a GNSS satellite whose expected location corresponds to a region of the image representing unobstructed sky.

2. The method of claim 1, wherein step b. comprises determining azimuthal orientation of the image.

3. The method of claim 2, wherein step b. comprises classifying at least one region of the image as unobstructed sky.

4. The method of claim 2, wherein step b. comprises determining an expected location of a GNSS satellite and determining whether the expected location corresponds to a region of the image classified as unobstructed sky.

5. The method of claim 1, wherein step c comprises: classifying as usable signals received from a GNSS satellite whose expected location corresponds to a region of the image representing unobstructed sky and classifying as not usable signals received from a GNSS satellite whose its expected location corresponds to a region of the image not representing unobstructed sky.

6. The method of claim 1, further comprising computing a fix using signals received from a GNSS satellite whose expected location corresponds to a region of the image representing unobstructed sky.

7. The method of claim 1, further comprising computing a fix using signals received from a GNSS satellite whose expected location corresponds to a region of the image not representing unobstructed sky.

8. The method of claim 1, wherein step a. comprises acquiring an image through a wide-angle optical collector aimed generally skyward from a position near the antenna.

9. The method of claim 1, wherein step a. comprises detecting energy in an least one infra-red frequency band.

10. The method of claim 1, wherein step a. comprises detecting energy in at least one visible-light frequency band.

11. The method of claim 1, further comprising:
    computing a fix using signals received exclusively from GNSS satellites whose respective expected locations correspond to regions of the image representing unobstructed sky, computing a fix using signals received from at least one GNSS satellite whose expected location corresponds to a region of the image not representing unobstructed sky, and comparing the fixes.

12. The method of claim 1, further comprising:
    displaying at least those portions of the image which correspond to expected locations of GNSS satellites.

13. The method of claim 12, further comprising receiving a user selection of whether to include signals received from any GNSS satellite when computing a fix.

14. Apparatus for processing GNSS signals, comprising:
    a. An imager to acquire an image representing surroundings of an antenna, and
    b. A comparator to determine whether an expected location of a GNSS satellite corresponds to a region of the image representing unobstructed sky, and to classify as usable signals received from a GNSS satellite whose expected location corresponds to a region of the image representing unobstructed sky.

15. The apparatus of claim 14, wherein the comparator takes account of azimuthal orientation of the image.

16. The apparatus of claim 14, further comprising an image analyzer which is capable of classifying as unobstructed sky a region of the image representing unobstructed sky.

17. The apparatus of claim 16, wherein the comparator determines an expected location of a GNSS satellite and determining whether the expected location corresponds to a region of the image classified as unobstructed sky.

18. The apparatus of claim 14, wherein the comparator classifies as usable signals received from a GNSS satellite whose expected location corresponds to a region of the image representing unobstructed sky and classifying as not usable signals received from a GNSS satellite whose its expected location corresponds to a region of the image not representing unobstructed sky.

19. The apparatus of claim 14, further comprising a processor to compute a fix using signals received from a GNSS satellite whose expected location corresponds to a region of the image representing unobstructed sky.

20. The apparatus of claim 14, further comprising a processor to compute a fix using signals received from a GNSS satellite whose expected location corresponds to a region of the image not representing unobstructed sky.

21. The apparatus of claim 14, wherein the imager comprises a wide-angle optical collector.

22. The apparatus of claim 14, wherein the imager comprises detector responsive to energy in at least one infra-red frequency band.

23. The apparatus of claim 14, wherein the imager comprises a detector responsive to energy in at least one visible-light frequency band.

24. The apparatus of claim 14, further comprising a processor to compute a fix using signals received exclusively from GNSS satellites whose respective expected locations correspond to regions of the image representing unobstructed sky, to compute a fix using signals received from at least one GNSS satellite whose expected location corresponds to a region of the image not representing unobstructed sky, and to compare the fixes.

25. The apparatus of claim 14, further comprising: a user interface to display at least those portions of the image which correspond to expected locations of GNSS satellites.

26. The apparatus of claim 14, further comprising a user interface to display at least those portions of the image which correspond to expected locations of GNSS satellites and to receive a user selection of whether to include signals received from any GNSS satellite when computing a fix.

27. The apparatus of claim 14, further comprising: a GNSS receiver responsive to signals from GNSS satellites received at the antenna for computing a fix from signals classfied by the comparator as usable.

28. The apparatus of claim 27, wherein the antenna is a component of the GNSS receiver.

29. The apparatus of claim 27, further comprising a position and orientation system to provide data to the comparator indicating orientation of the imager.

* * * * *